United States Patent
Parkinson (10) Patent No.: US 8,296,559 B2
(45) Date of Patent: Oct. 23, 2012

(54) PEER-TO-PEER SMIME MECHANISM

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1183 days.

(21) Appl. No.: 11/809,831

(22) Filed: May 31, 2007

(65) Prior Publication Data
US 2008/0301438 A1     Dec. 4, 2008

(51) Int. Cl.
*H04L 9/32* (2006.01)
(52) U.S. Cl. .......................... 713/152; 713/156
(58) Field of Classification Search .................. 713/152, 713/156, 155, 157, 177, 173; 726/18; 380/277, 380/278, 283
See application file for complete search history.

(56) References Cited

U.S. PATENT DOCUMENTS

| | | | |
|---|---|---|---|
| 7,010,683 B2 * | 3/2006 | Corella | 713/156 |
| 7,203,753 B2 * | 4/2007 | Yeager et al. | 709/225 |
| 7,213,047 B2 * | 5/2007 | Yeager et | 709/202 |
| 7,222,187 B2 * | 5/2007 | Yeager et al. | 709/237 |
| 7,275,102 B2 * | 9/2007 | Yeager et al. | 709/224 |
| 7,308,496 B2 * | 12/2007 | Yeager et al. | 709/224 |
| 7,383,433 B2 * | 6/2008 | Yeager et al. | 713/157 |
| 2001/0032310 A1 * | 10/2001 | Corella | 713/156 |
| 2002/0188689 A1 * | 12/2002 | Michael | 709/206 |
| 2003/0028585 A1 * | 2/2003 | Yeager et al. | 709/201 |
| 2003/0055894 A1 * | 3/2003 | Yeager et al. | 709/204 |
| 2003/0055898 A1 * | 3/2003 | Yeager et al. | 709/205 |
| 2003/0070070 A1 * | 4/2003 | Yeager et al. | 713/157 |
| 2004/0088347 A1 * | 5/2004 | Yeager et al. | 709/202 |
| 2004/0088369 A1 * | 5/2004 | Yeager et al. | 709/217 |
| 2004/0230652 A1 * | 11/2004 | Estrada et al. | 709/204 |
| 2004/0230658 A1 * | 11/2004 | Estrada et al. | 709/206 |
| 2004/0230662 A1 * | 11/2004 | Estrada et al. | 709/207 |
| 2004/0230793 A1 * | 11/2004 | Estrada et al. | 713/156 |
| 2005/0038991 A1 * | 2/2005 | Brown et al. | 713/156 |
| 2005/0086300 A1 * | 4/2005 | Yeager et al. | 709/204 |
| 2005/0188193 A1 * | 8/2005 | Kuehnel et al. | 713/155 |
| 2006/0168443 A1 * | 7/2006 | Miller et al. | 713/156 |
| 2006/0268802 A1 * | 11/2006 | Faccin | 370/338 |
| 2007/0033400 A1 * | 2/2007 | Senez, Jr. | 713/168 |
| 2007/0061878 A1 * | 3/2007 | Hagiu et al. | 726/14 |
| 2007/0130464 A1 * | 6/2007 | Swedor et al. | 713/170 |
| 2007/0135866 A1 * | 6/2007 | Baker et al. | 607/60 |
| 2007/0150726 A1 * | 6/2007 | Sinnreich et al. | 713/156 |
| 2007/0248085 A1 * | 10/2007 | Volpano | 370/389 |
| 2008/0120557 A1 * | 5/2008 | Offenhartz et al. | 715/760 |
| 2009/0077381 A1 * | 3/2009 | Kanungo et al. | 713/170 |

\* cited by examiner

*Primary Examiner* — Eleni Shiferaw
*Assistant Examiner* — Abu Sholeman
(74) *Attorney, Agent, or Firm* — Lowenstein Sandler PC (57) ABSTRACT

A method and apparatus for sending a self-asserted certificate is described. A mail client of a sender is configured to generate a public and private key pair, to create a self-signed certificate, and to form an introduction message addressed to a recipient to enable use of the self-signed certificate prior to corresponding with the recipient. A mail client of a recipient is configured to display an indicator of a receipt of the introduction message from the sender. The indicator comprises a user interface query to the recipient to verify and accept the sender-signed certificate in response to receiving the introduction message from the sender.

33 Claims, 7 Drawing Sheets

FIG. 1A

-- Prior Art --

FIG. 1B

-- Prior Art --

PEER-TO-PEER SMIME MECHANISM

TECHNICAL FIELD

Embodiments of the present invention relate to authentication, an more particularly, to a method for configuring a mail client.

BACKGROUND

A mail client is an application program that provides a user the ability to send and receive emails on the Internet. Several methods exist for authenticating an email communication between mail clients.

Figure 1A:
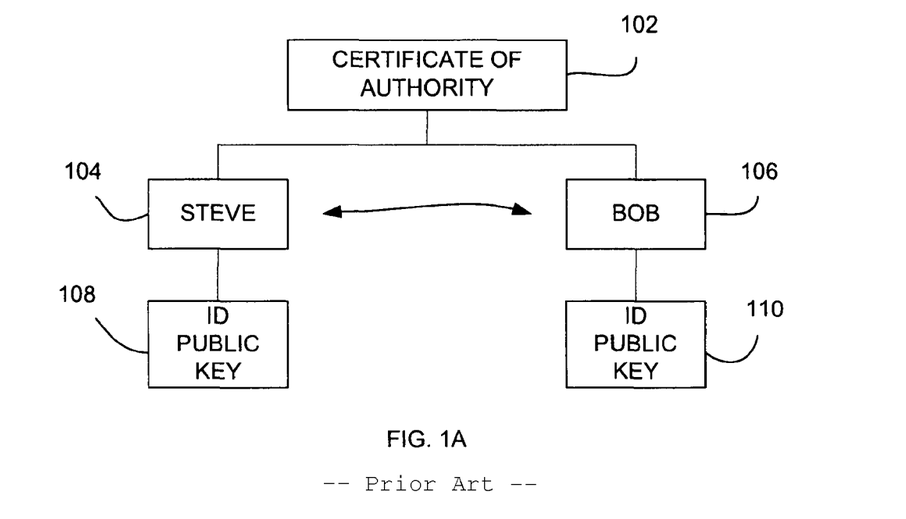
FIG. 1A illustrates a block diagram of a trust model based on certificates of authority.
Figure 1B:
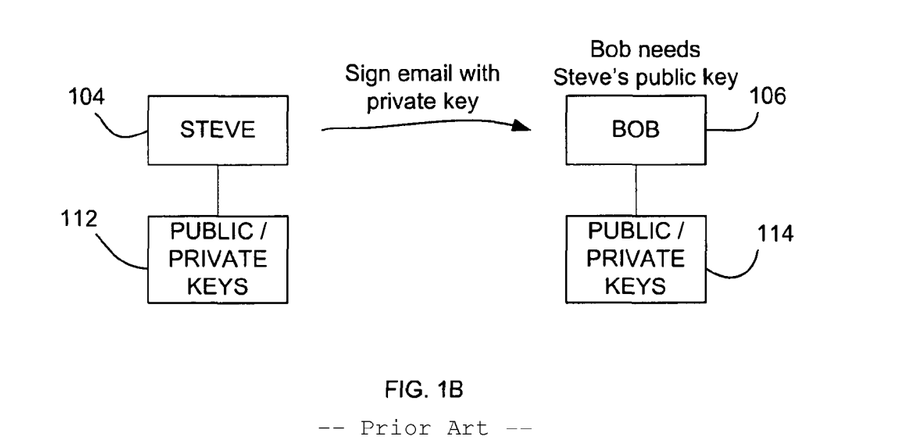
FIG. 1B illustrates a block diagram of a trust model based on public and private key pair.

FIG. 1A illustrates a block diagram of a trust model based on certificates of authority. FIG. 1B illustrates a block diagram of a trust model based on public and private key pair. A certificate of authority provider 102 certifies different users: Steve 102, and Bob 106. As such each user 104, 106 certified by the provider 102 has a certificate 108, 110 issued by the provider 102. The identity and public key are all signed by the certificate of authority 102. In a large SMIME deployment, all users will be made to trust the certificate authority, and so by implication, all user certificates that have been issued by the certificate authority. Upon receipt of a signed email, the email will show as being signed. However, this process is onerous for smaller deployments who cannot afford to set up a certificate authority. Also, if the certificate is used only to communicate with a small number of peers, it may not be economically viable to buy a certificate from a third party. Although a user can create his own self-signed certificate, this process is cumbersome. Additionally, the certificate must be transmitted to a peer if it is to be useful for encryption purposes, and the mechanism for this is also cumbersome.

As such, a need exists for a method or system that helps overcome one or more of the above-described limitations.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for configuring a mail client. In one embodiment, a mail client of a sender is configured to generate a public and private key pair, to create a self-signed certificate, and to form an introduction message addressed to a recipient to enable use of the self-signed certificate prior to corresponding with the recipient. A mail client of a recipient is configured to display an indicator of a receipt of the introduction message from the sender. The indicator comprises a user interface query to the recipient to verify and accept the sender-signed certificate in response to receiving the introduction message from the sender.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-accessible storage medium includes any mechanism for storing or transmitting information in a form readable by a machine (e.g., a computer). For example, a machine-accessible storage medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

System Architecture

Figure 2:
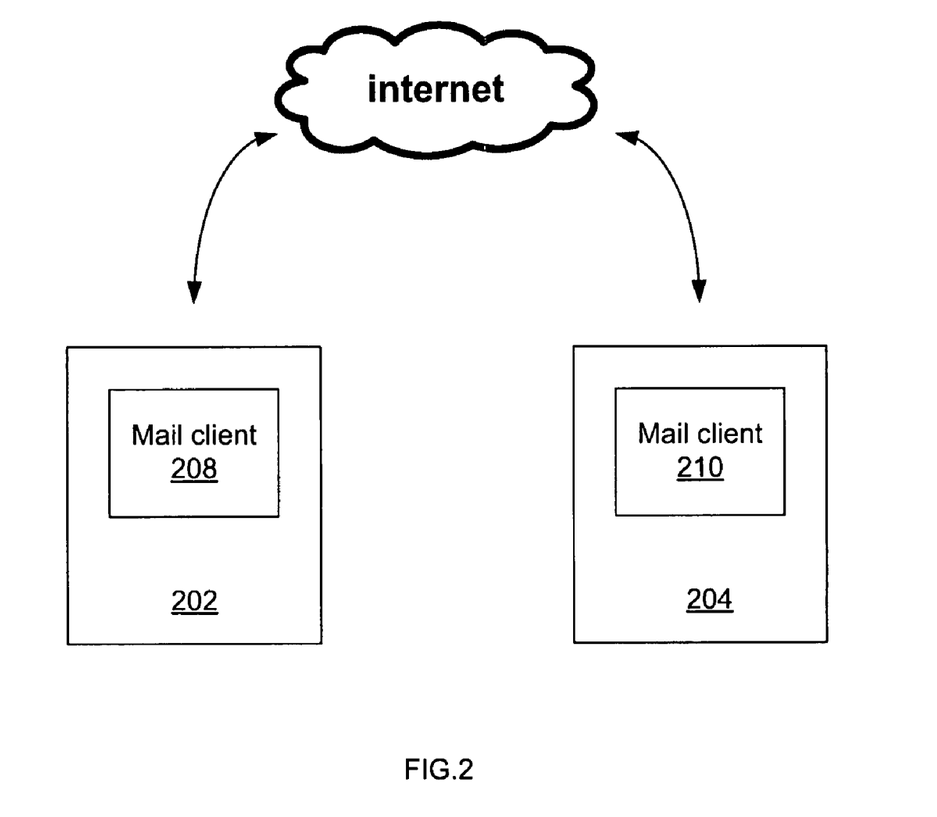
FIG. 2 illustrates a block diagram of a network architecture of a trust model in accordance with one embodiment.

FIG. 2 illustrates a system architecture 200 in which one embodiment of the present invention may be implemented. The system architecture 200 comprises client devices 202, 204, and a network (e.g. Internet) 206. The client devices 202 and 204 may be personal computers (PCs), wireless telephones, palm-sized computing devices, personal digital assistants (PDAs), consumer electronic devices, etc. The client devices 202 and 204 may communicate with each other via the network 206, which may be a public network (e.g., Internet) or a private network (e.g., Ethernet or a local area Network (LAN)).

Client devices 202 and 204 may include a mail client 208 and 210 respectively. The mail clients may enable a user of each client device to communicate with others via email with the network 206. Each mail client may be configured according its the client device. For example, the mail client may include information about the user, such as his name, email address, contact information. The mail client may also contain an address book of names, email addresses, and contact information. The mail client may be configured to access the network 206 via a service provider (not shown). As such, other parameters such as POP or SMTP attributes may be stored in the mail client. Each mail client may be further configured to generate a key pair, create a self-signed certificate, and send the self-signed certificate. These functionalities are further described below.

Mail Client

Figure 3:
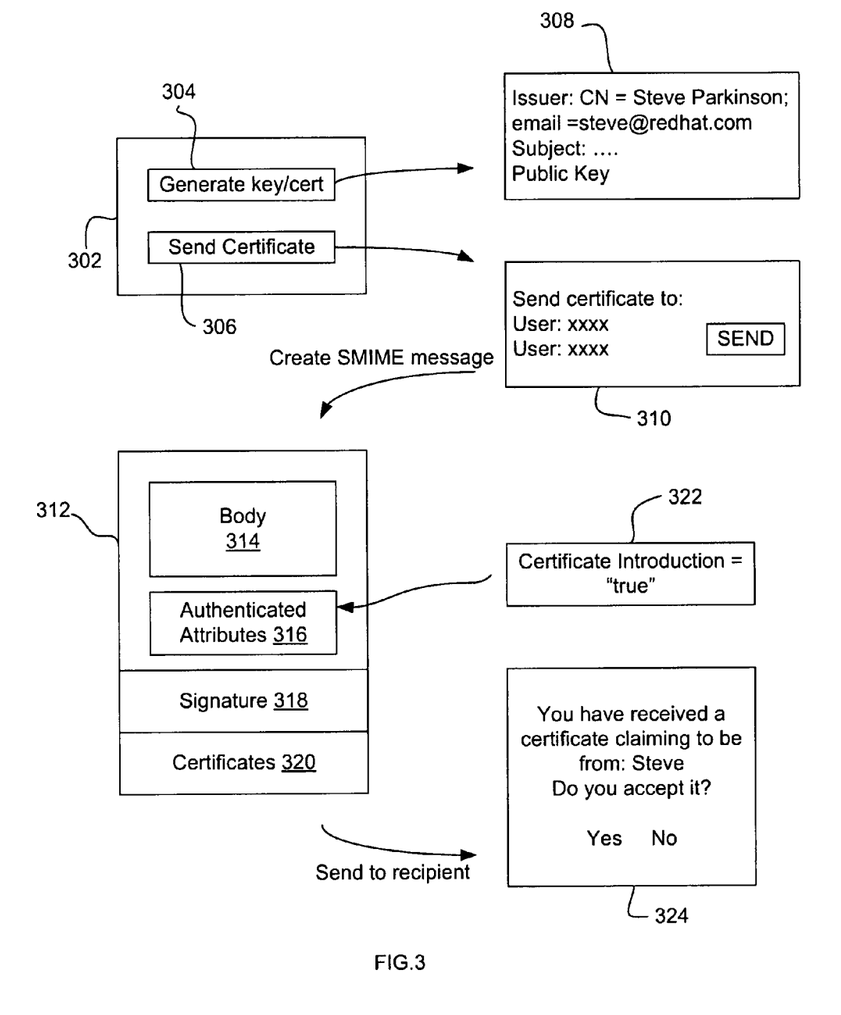
FIG. 3 illustrates a block diagram of a user interface for a mail client in accordance with one embodiment.

FIG. 3 illustrates one embodiment of a user interface for a mail client of a sender and a recipient. A user interface 302 of a mail client may include a dialog box with two buttons: a "generate key/certificate" button 304 and a "send certificate" button 306.

When a user of the mail client selects the generate button 304, the mail client creates a key pair, and a self-signed certificate 308 at the request of the user. This is particularly useful when the user has not previously set up these authentication credentials and tools. The self-signed certificate 308 may be generated based on the information already stored in the mail client, e.g, the user name, email address, etc. In accordance with one embodiment, a self-signed certificate may be a certificate issued by the mail client. In other words, the mail client may act as its own certificate of authenticity issuer.

When the user of the mail client selects the "send certificate" button 306, the mail client generates an email that to be sent out to recipients selected by the user. In one embodiment, a user interface 310 may contain a dialog box asking for the user to input or select one or more recipients to receive the self-signed certificate.

After selecting the recipients, the mail client may create an email. In one embodiment, an SMIME introduction message 312 may be formed. The SMIME introduction message 312 may include a body 314, authenticated attributes 316, a signature 318, and the self-signed certificate 320. The authenticated attributes may include a flag 322 such as certificate introduction="true" to notify the recipient(s) of the introduction message and to handle it accordingly. The flag 322 indicates whether the sender is self-asserting their own identity. The SMIME introduction message 312 is sent to the recipient.

The mail client of the recipient may display an indication that the recipient has just receives a SMIME introduction message 312 as determined by looking at the flag 322. This triggers a special user interface 324 in the recipient's system, which distinguishes it from a regular authority certificate. The recipient mail client may generate a user interface 324 asking the recipient to accept the self-signed certificate. In accordance with another embodiment, the recipient's mail client may infer a self-asserted certificate by virtue of the fact that the certificate is self-signed, and the certificate has an email address in it.

In accordance with another embodiment, the recipient mail client may also prompt the recipient to verify the authenticity of the self-signed certificate via out-of-band means.

Figure 4:
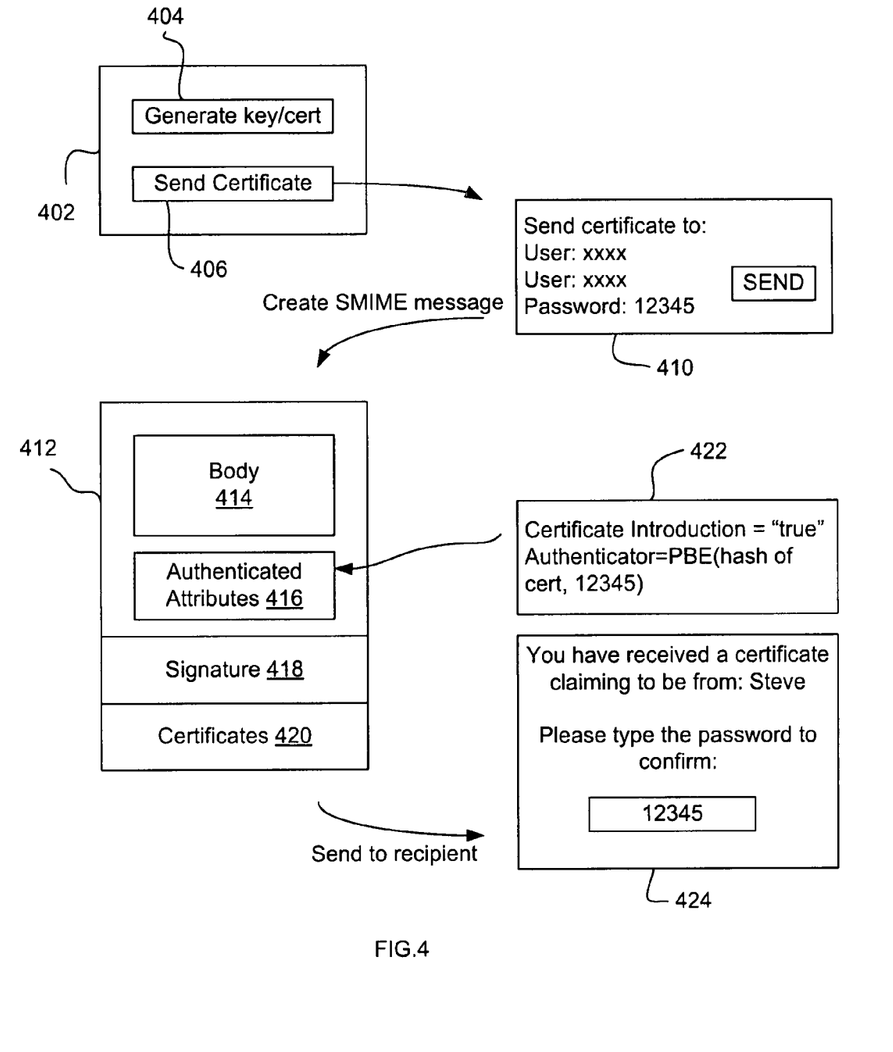
FIG. 4 illustrates a block diagram of a user interface for a mail client in accordance with another embodiment.

FIG. 4 illustrates another embodiment of a user interface for a mail client of a sender and a recipient. A user interface 402 of a mail client of a sender may include a dialog box with two buttons: a "generate key/certificate" button 404 and a "send certificate" button 406.

When a user of the mail client selects the "generate" button 404, the mail client creates a key pair, and a self-signed certificate 408 at the request of the user as previously described. When the user of the mail client selects the "send certificate" button 406, the mail client generates an email that to be sent out to recipients selected by the user. In one embodiment, a user interface 410 may contain a dialog box asking for the user to input or select one or more recipients to receive the self-signed certificate. A mechanism to facilitate an out-of-band proof of the certificate integrity may include an authenticator.

In one embodiment, the authenticator may include "an authenticated attribute" in SMIME payload which may be a hash of the certificate encrypted with a key. The key may be a pre-agreed secret key transmitted out-of-band to the recipient. The key may also be generated by a password based encryption (PBE) algorithm such as PKCS#5, or derived from a password sent to the recipient out-of-band. FIG. 4 illustrates a user interface 410 with a self-selected password for each introduction message, or an automatically generated password for each introduction message. The password may contain a limited number of digits for ease of memorization.

After selecting the recipients, the mail client may create an email. In one embodiment, the SMIME introduction message 412 may be formed. The SMIME introduction message 412 may include a body 414, authenticated attributes 416, a signature 418, and the self-signed certificate 420. The authenticated attributes may include a flag 422 such as certificate introduction="true" to notify the recipient(s) of the introduction message and to handle it accordingly. The flag 422 indicates whether the sender is self-asserting their own identity. The flag 422 may also include the authenticator as previously discussed. In the example of FIG. 4, the authenticator is a hash of both the encryption certificate and the signing certificate based on the password as provided in user interface 410. The SMIME introduction message 412 is then sent to the recipient.

The mail client of the recipient may display an indication that the recipient has just received a SMIME introduction message 412 as determined by the flag 422. This triggers a special user interface 424 in the recipient's system, which distinguishes it from a regular authority certificate. The recipient mail client may generate the user interface 424 asking the recipient to accept the self-signed certificate. Furthermore, the user interface 424 may ask the recipient for the password/key that has been conveyed by the sender out-of-band (for example, orally). Entering the password in user interface 424 causes the hash to be decrypted, which is then compared against a hash newly derived from the certificate in the introduction message. A successful comparison may result in the certificates being associated with the sender (i.e. The recipient has accepted the certificates). The mail client may store the certificates.

In accordance with another embodiment, no action may be required on behalf of a recipient. An acknowledgment reply may be sent automatically back to the sender. The acknowledgment reply may include the public key and certificate of the recipient.

In accordance with another embodiment, a special flag that is placed in the introduction message indicating that the message is the result for a "key/certificate" introduction may trigger a user interface in the recipient's mail client, and ask the user if he would like to reply with his own certificate.

Computer System

Figure 5:
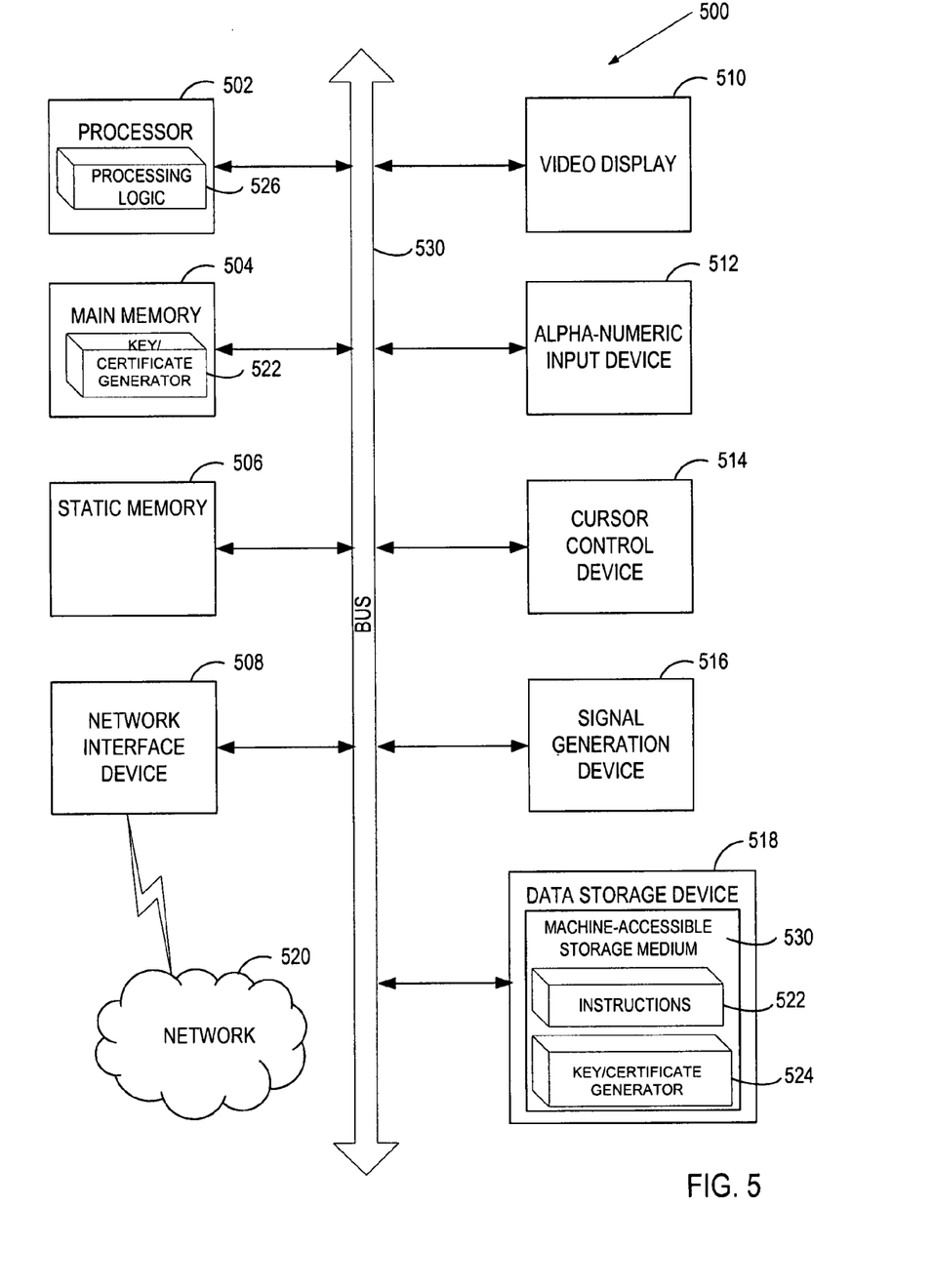
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the bookmark plug-in 524. The bookmark plug-in 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
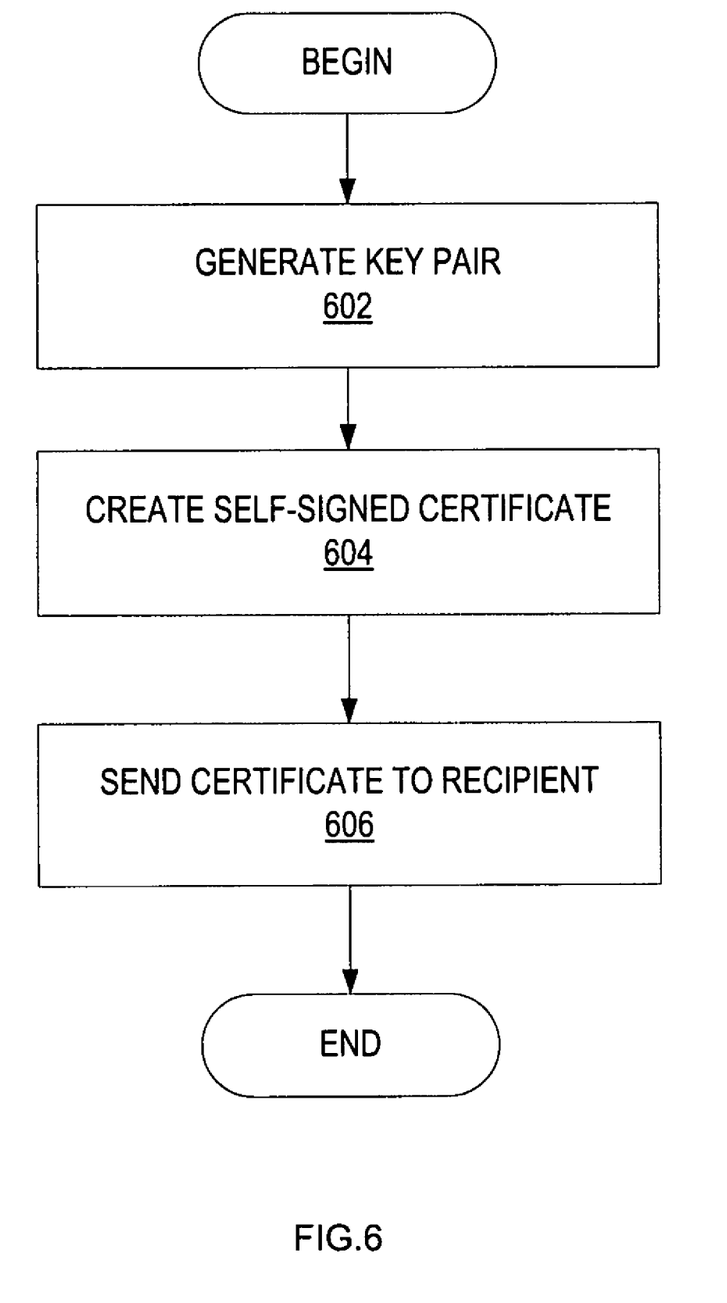
FIG. 6 illustrates a flow diagram of a method for configuring a mail client of a sender in accordance with one embodiment.

FIG. 6 illustrates a flow diagram of one embodiment of a method for configuring a mail client. At 602, a mail client may generate a public and private key pair. At 604, the mail client may create one or more self-signed certificates. At 606, the mail client forms an introduction message containing the self-signed certificate and send it to selected recipients to enable use of the self-signed certificate prior to corresponding with the recipients.

Figure 7:
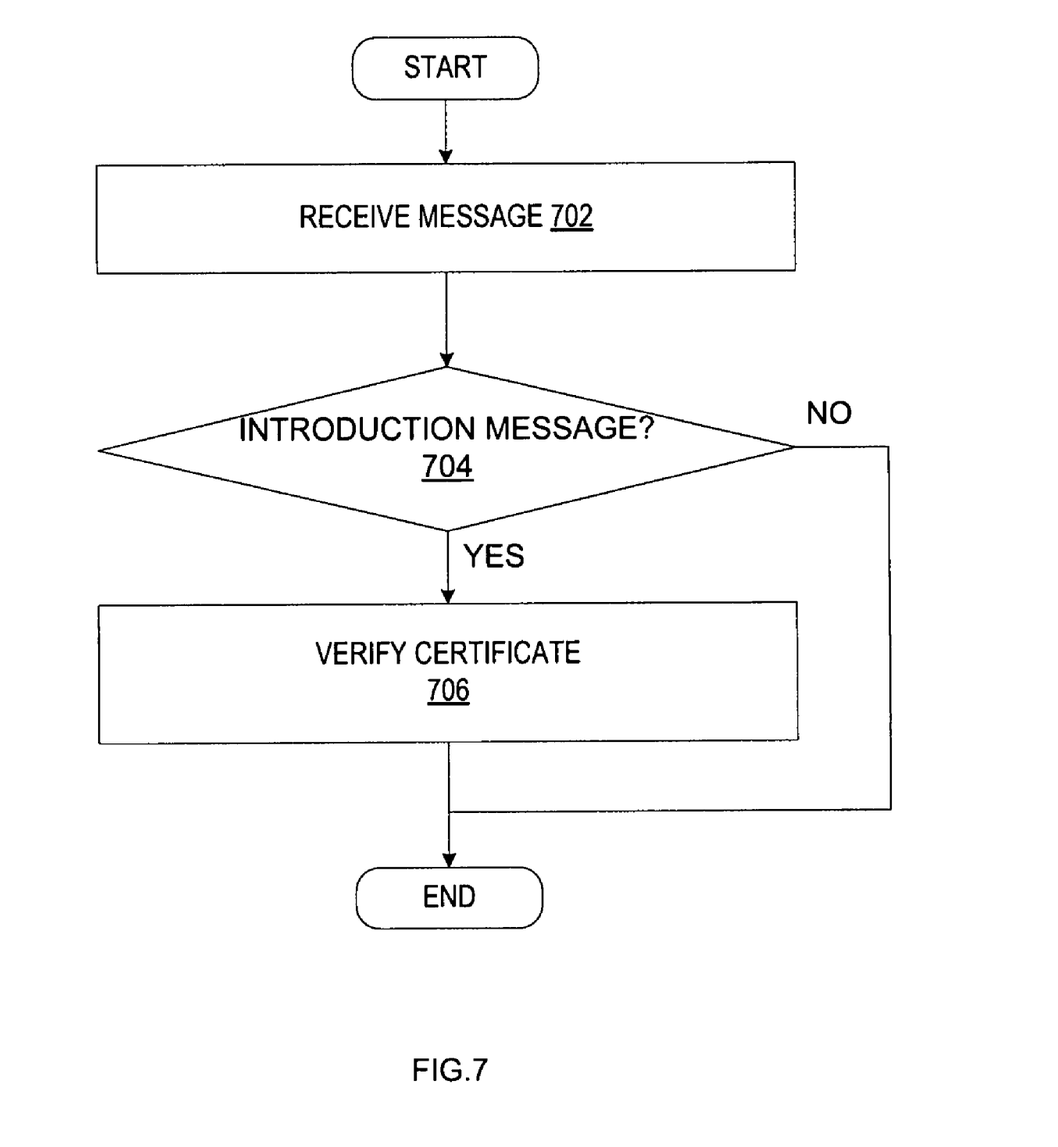
FIG. 7 illustrates a flow diagram of a method for configuring a mail client of a recipient in accordance with one embodiment.

FIG. 7 illustrates a flow diagram of one embodiment of a method for configuring a mail client. At 702, a mail client receives a message. At 704, the mail client determines whether the message is an introduction message from a sender by examining a flag in the message. At 706, the mail client verifies the authenticity of the sender-signed certificates. The mail client may form a user interface query to a user of the mail client to verify and accept the sender-signed certificate in response to receiving the introduction message from the sender.

Thus, a method and apparatus for configuring a mail client has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A computer-implemented method comprising:
    generating, by a mail client of a sender client device, a public and private key pair;
    generating, by the mail client, a self-signed certificate of a sender that includes the public key of the public and private key pair, wherein the sender acts as its own certificate of authenticity issuer for the self-signed certificate;

forming, by the mail client, an introduction message comprising the self-signed certificate of the sender and an authenticated attribute, the introduction message addressed to a recipient, wherein the authenticated attribute is out of band proof comprising a password-based encryption (PBE) of a hash of the self-signed certificate that is based on a user-selected password for the introduction message; and sending, by the mail client, the introduction message to the recipient;

wherein when the introduction message is received at a mail client of the recipient, the introduction message triggers the mail client of the recipient to provide a user interface that queries the recipient to confirm the user-selected password for the introduction message and to accept the self-signed certificate upon confirmation of the user-selected password.

2. The method of claim 1 further comprising:
generating the public and private key pair in response to a request of a user of the mail client; and
creating the self-signed certificate based on the user information from the mail client.

3. The method of claim 1 further comprising:
forming an SMIME introduction message in response to a request of a user of the mail client to send the self-signed certificate to the recipient.

4. The method of claim 1 wherein the introduction message comprises an SMIME introduction message comprising a body, the authenticated attribute, a signature, and the self-signed certificate.

5. The method of claim 4 wherein a value of the authenticated attribute triggers a user interface query in a mail client of the recipient to accept the self-signed certificate.

6. The method of claim 4 wherein the authenticated attribute comprises an authenticator, the authenticator comprises the out of band proof.

7. The method of claim 6 wherein the out of band proof comprises a pre-agreed secret key transmitted out of band to the recipient, a value of the authenticated attribute to trigger a user interface query in a mail client of the recipient to confirm the pre-agreed secret key and to accept the self-signed certificate upon confirmation of the pre-agreed secret key.

8. A computer-implemented method comprising:
receiving, by a mail client of a recipient client device, an introduction message from a sender to a recipient that utilizes the mail client, the introduction message comprising a public key of the sender, a sender-signed certificate, and an authenticated attribute, wherein the sender acts as a certificate of authenticity issuer for the sender-signed certificate, and wherein the authenticated attribute is out of band proof comprising a password-based encryption (PBE) of a hash of the self-signed certificate that is based on a user-selected password for the introduction message;
displaying, by the mail client, an indication that the introduction message has been received;
generating, by the mail client, a user interface to the recipient, the user interface configured to:
query the recipient to confirm the user-selected password for the introduction message; and
accept the sender-signed certificate upon confirmation of the user-selected password; and
receiving, by the mail client from the recipient via the user interface, an indication that the recipient has accepted the sender-signed certificate.

9. The method of claim 8 wherein the introduction message is an SMIME introduction message comprising a body, the authenticated attribute, a signature, and the sender-signed certificate.

10. The method of claim 9 wherein a value of the authenticated attribute triggers the user interface in the mail client to accept the sender-signed certificate.

11. The method of claim 9 wherein the authenticated attribute comprises an authenticator, the authenticator comprises the out of band proof.

12. The method of claim 11 wherein the out of band proof comprises a pre-agreed secret key transmitted out of band from the sender, a value of the authenticated attribute to trigger the user interface query in the mail client to confirm the pre-agreed secret key and to accept the sender-signed certificate upon confirmation of the pre-agreed secret key.

13. A non-transitory computer-accessible storage medium including data that, when accessed by a computer system, cause the computer system to perform a method comprising:
generating, by a mail client of a sender client device, a public and private key pair;
generating, by the mail client, a self-signed certificate of a sender that includes the public key of the public and private key pair, wherein the sender acts as its own certificate of authenticity issuer for the self-signed certificate;
forming, by the mail client, an introduction message comprising the self-signed certificate of the sender and an authenticated attribute, the introduction message addressed to a recipient, wherein the authenticated attribute is out of band proof comprising a password-based encryption (PBE) of a hash of the self-signed certificate that is based on a user-selected password for the introduction message; and
sending, by the mail client, the introduction message to the recipient;
wherein when the introduction message is received at a mail client of the recipient, the introduction message triggers the mail client of the recipient to provide a user interface that queries the recipient to confirm the user-selected password for the introduction message and to accept the self-signed certificate upon confirmation of the user-selected password.

14. The non-transitory computer-accessible storage medium of claim 13 wherein the method further comprises:
generating the public and private key pair in response to a request of a user of the mail client; and
creating the self-signed certificate based on the user information from the mail client.

15. The non-transitory computer-accessible storage medium of claim 13 wherein the method further comprises:
forming an SMIME introduction message in response to a request of a user of the mail client to send the self-signed certificate to the recipient.

16. The non-transitory computer-accessible storage medium of claim 13 wherein the introduction message comprises an SMIME introduction message comprising a body, the authenticated attribute, a signature, and the self-signed certificate.

17. The non-transitory computer-accessible storage medium of claim 16 wherein a value of the authenticated attribute triggers a user interface query in a mail client of the recipient to accept the self-signed certificate.

18. The non-transitory computer-accessible storage medium of claim 16 wherein the authenticated attribute comprises an authenticator, the authenticator comprises the out of band proof.

19. The non-transitory computer-accessible storage medium of claim 18 wherein the out of band proof comprises a pre-agreed secret key transmitted out of band to the recipient, a value of the authenticated attribute to trigger a user interface query in a mail client of the recipient to confirm the pre-agreed secret key and to accept the self-signed certificate upon confirmation of the pre-agreed secret key.

20. A non-transitory computer-accessible storage medium including data that, when accessed by a computer system, cause the computer system to perform a method comprising:
receiving, at a mail client of a recipient client device, an introduction message from a sender to a recipient that utilizes the mail client, the introduction message comprising a public key of the sender, a sender-signed certificate, and an authenticated attribute, wherein the sender acts as a certificate of authenticity issuer for the sender-signed certificate, and wherein the authenticated attribute is out of band proof comprising a password-based encryption (PBE) of a hash of the self-signed certificate that is based on a user-selected password for the introduction message;
displaying, by the mail client, an indication that the introduction message has been received;
generating, by the mail client, a user interface to the recipient, the user interface configured to:
query the recipient to confirm the user-selected password for the introduction message; and
accept the sender-signed certificate upon confirmation of the user-selected password; and
receiving, by the mail client from the recipient via the user interface, an indication that the recipient has accepted the sender-signed certificate.

21. The non-transitory computer-accessible storage medium of claim 20 wherein the introduction message is an SMIME introduction message comprising a body, authenticated attribute, a signature, and the sender-signed certificate.

22. The non-transitory computer-accessible storage medium of claim 21 wherein a value of the authenticated attribute triggers the user interface in the mail client to accept the sender-signed certificate.

23. The non-transitory computer-accessible storage medium of manufacture of claim 21 wherein the authenticated attribute comprises an authenticator, the authenticator comprises the out of band proof.

24. The non-transitory computer-accessible storage medium of manufacture of claim 23 wherein the out of band proof comprises a pre-agreed secret key transmitted out of band from the sender, a value of the authenticated attribute to trigger the user interface query in the mail client to confirm the pre-agreed secret key and to accept the sender-signed certificate upon confirmation of the pre-agreed secret key.

25. A client computer system comprising:
a memory; and
a processing device to execute a mail client from the memory, the mail client configured to:
generate a public and private key pair;
create a self-signed certificate of a sender that includes the public key of the public and private key pair, wherein the sender acts as its own certificate of authenticity issuer for the self-signed certificate;
form an introduction message comprising the self-signed certificate of the sender and an authenticated attribute, the introduction message addressed to a recipient, wherein the authenticated attribute is out of band proof comprising a password-based encryption (PBE) of a hash of the self-signed certificate that is based on a user-selected password for the introduction message; and
send the introduction message to the recipient;
wherein when the introduction message is received at a mail client of the recipient, the introduction message triggers the mail client of the recipient to provide a user interface that queries the recipient to confirm the user-selected password for the introduction message and to accept the self-signed certificate upon confirmation of the user-selected password.

26. The client computer system of claim 25 wherein the mail client is to generate the public and private key pair in response to a request of a user of the mail client, and is to create the self-signed certificate based on the user information from the mail client.

27. The client computer system of claim 25 wherein the mail client is to form an SMIME introduction message in response to a request of a user of the mail client to send the self-signed certificate to the recipient, the SMIME introduction message comprising a body, the authenticated attribute, a signature, and the self-signed certificate.

28. The client computer system of claim 27 wherein a value of the authenticated attribute triggers a user interface query in a mail client of the recipient to accept the self-signed certificate.

29. The client computer system of claim 27 wherein the authenticated attribute comprises an authenticator, the authenticator comprises the out of band proof.

30. A client computer system comprising:
a memory; and
a processing device to execute a mail client from the memory, the mail client configured to:
receive an introduction message from a sender to a recipient that uses the mail client, the introduction message comprising a public key of the sender, a sender-signed certificate, and an authenticated attribute, wherein the sender acts as a certificate of authenticity issuer for the sender-signed certificate, and wherein the authenticated attribute is out of band proof comprising a password-based encryption (PBE) of a hash of the self-signed certificate that is based on a user-selected password for the introduction message;
display an indication that the introduction message has been received;
generate a user interface to the recipient, the user interface configured to:
query the recipient to confirm the user-selected password for the introduction message; and
accept the sender-signed certificate upon confirmation of the user-selected password; and
receive, from the recipient via the user interface, an indication that the recipient has accepted the sender-signed certificate.

31. The client computer system of claim 30 wherein the introduction message is an SMIME introduction message comprising a body, the authenticated attribute, a signature, and the sender-signed certificate.

32. The client computer system of claim 31 wherein a value of the authenticated attribute triggers the user interface in the mail client to accept the sender-signed certificate.

33. The client computer system of claim 31 wherein the authenticated attribute comprises an authenticator, the authenticator comprises the out of band proof.

* * * * *